E. LEES.
GYROSCOPIC STEERING MECHANISM OF AUTOMOBILE TORPEDOES.
APPLICATION FILED SEPT. 4, 1918.

1,328,571.

Patented Jan. 20, 1920.
6 SHEETS—SHEET 1.

Edgar Lees, Inventor
Pennie, Davis, Marvin & Edmonds,
Attorneys

E. LEES.
GYROSCOPIC STEERING MECHANISM OF AUTOMOBILE TORPEDOES.
APPLICATION FILED SEPT. 4, 1918.

1,328,571.

Patented Jan. 20, 1920.
6 SHEETS—SHEET 2.

E. LEES.
GYROSCOPIC STEERING MECHANISM OF AUTOMOBILE TORPEDOES.
APPLICATION FILED SEPT. 4, 1918.

1,328,571.

Patented Jan. 20, 1920.
6 SHEETS—SHEET 6.

Edgar Lees, Inventor
Pennie, Davis, Marvin & Edmonds,
Attorneys

UNITED STATES PATENT OFFICE.

EDGAR LEES, OF WEYMOUTH, ENGLAND, ASSIGNOR TO THE WHITEHEAD TORPEDO WORKS (WEYMOUTH) LIMITED, OF WEYMOUTH, ENGLAND.

GYROSCOPIC STEERING MECHANISM OF AUTOMOBILE TORPEDOES.

1,328,571.      Specification of Letters Patent.      Patented Jan. 20, 1920.

Application filed September 4, 1918. Serial No. 252,642.

*To all whom it may concern:*

Be it known that I, EDGAR LEES, a subject of the King of Great Britain, residing at Weymouth, in the county of Dorset, England, have invented certain new and useful Improvements in or Relating to the Gyroscopic Steering Mechanism of Automobile Torpedoes, of which the following is a specification.

This invention relates to the gyroscopic steering mechanism of automobile torpedoes in which means (herein termed "angling gear") are provided for adjusting the gyroscopic mechanism in such a manner that the torpedo, after it has been launched or ejected, becomes deflected or turned through a predetermined angle with respect to the direction in which it was launched or ejected, and continues its run on a straight course at the said angle.

Figure 2:
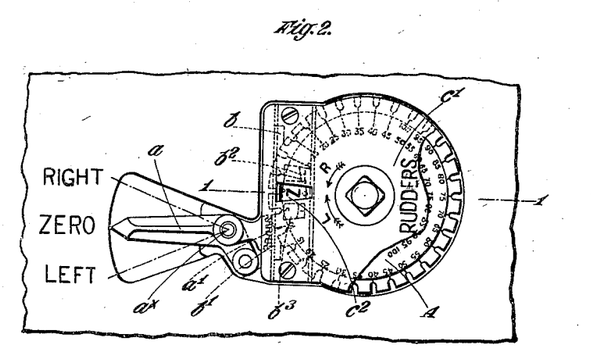

In certain angling gears now in use a single dial, similar to that shown by Figure 2 of the attached drawings, is used for indicating the angle to which the gear is adjusted, the graduations on this dial extending through a complete circle and being used both for right and left hand settings of the gear. The graduations are numbered from 0 to 100° in two series and overlap from 50° to 100°; in one of these series the numbers increase in a clockwise direction and correspond to a setting of the gear to cause the torpedo to turn in one direction and in the other series they increase in an anti-clockwise direction and correspond to a setting of the gear to cause the torpedo to turn in the other direction. In such an arrangement the direction in which the torpedo is to turn is thus determined by the direction of movement of the dial but after the gear has been adjusted in this manner it cannot be determined by inspection whether the dial has been moved in a clockwise or in an anti-clockwise direction, that is to say whether the angling gear has been adjusted to cause the torpedo to turn to the left or the right as the case may be. Thus if the dial has been moved in a clockwise direction to cause the torpedo to turn to the left through an angle of 90° (in which case the graduation marked 90° on one series of graduations lies opposite the fixed index mark or pointer as does also the graduation marked 60° on the other series of graduations) it cannot afterward be ascertained by inspection of the dial whether this setting of the dial corresponds to an adjustment of the angling gear to turn the torpedo to the left through an angle of 90° or to the right through an angle of 60°.

Similarly in another type of angling gear (such as that described in my British patent application No. 2168 of 1917) having two dials, one a primary or minutes dial and the other a secondary or degrees dial, it cannot be ascertained by mere inspection after setting the primary or minutes dial in which direction the torpedo will turn after launching *i. e.* whether the direction of movement of the dial during the setting was clockwise or anti-clockwise.

According to the present invention I provide positive means for determining and visibly indicating, not only the angle through which the torpedo will be turned or deflected after launching but also the direction in which it will turn in taking up its predetermined course. The said means are also so constructed and arranged that the angling gear can be adjusted to the desired angle only in that direction which is predetermined and indicated, that the gear is locked in the zero position, and that the gyroscopic mechanism can only be restored to the zero position, after having had angling movement imparted to it, by a movement in the reverse direction to that given in effecting the angling adjustment. The said means may also be so constructed and arranged that only the particular series of graduations having reference to the predetermined direction of movement of the angling gear will be visible.

The means for locking and releasing the pointer that determines and visibly indicates the direction in which the torpedo will turn in taking up its predetermined course, are preferably actuated from the indicating dial or one of the indicating dials through an intermittently operated pin and slot contrivance preferably comprising a train of two or more radially slotted wheels which receive their movement from a pin on the indicating dial or one of them and the last one of which carries segmental flanges constituting stops with which a bolt or other locking member actuated by the movement of the pointer, is adapted to coöperate, in order to retain the pointer in either of the positions to which it has been set. The said radially slotted wheels may have peripheral depressions those on one of them engaging with the periphery of a circular flange or rim moving with the dial and those on the other of them engaging with the periphery of a circular flange or rim on the first mentioned wheel, thus providing for the locking of the contrivance during the intervals between the intermittent movements of the wheels somewhat in the manner of a Geneva stop.

In order that the said invention may be clearly understood and readily carried into effect I will describe the same more fully with reference to the accompanying drawings, in which:—

Figure 4:
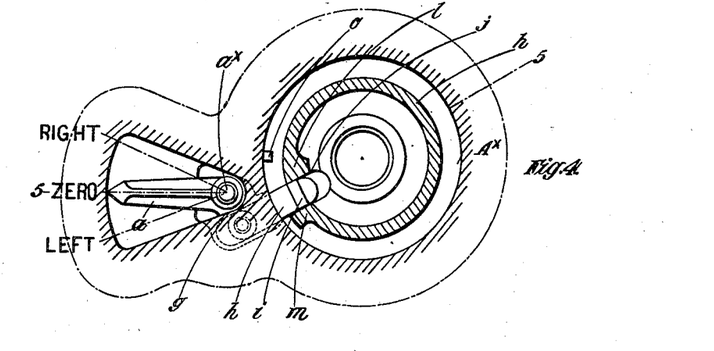
Figs. 4 and 5 are respectively a sectional plan taken on the lines 4, 4 of Fig. 5 and a vertical section taken on the line 5, 5 of Fig. 4 showing a further constructional form of the invention also applied to a single dial type of angling gear.
Figure 5:
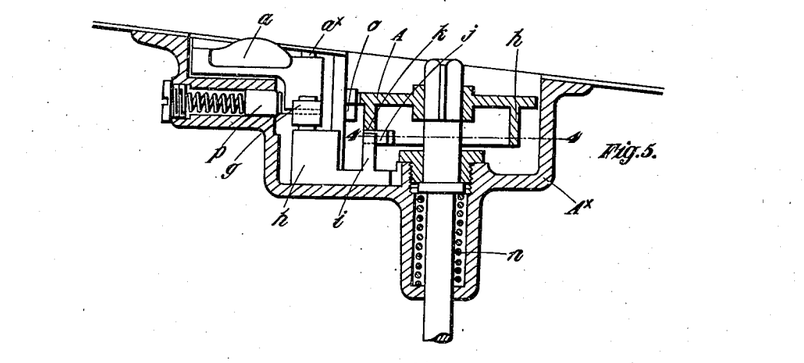
Figure 6:
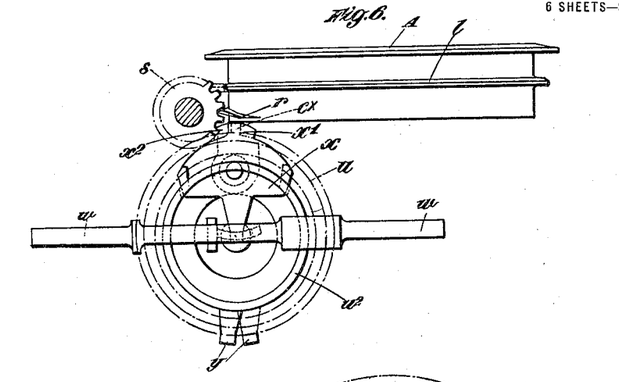
Figs. 6, 7 and 8 are respectively an elevation, a sectional elevation at right angles to Fig. 6 and a sectional plan of Fig. 6, showing a constructional form of the invention applied to an angling gear having two dials of which the primary or minutes dial has to make more than one complete revolution.
Figure 7:
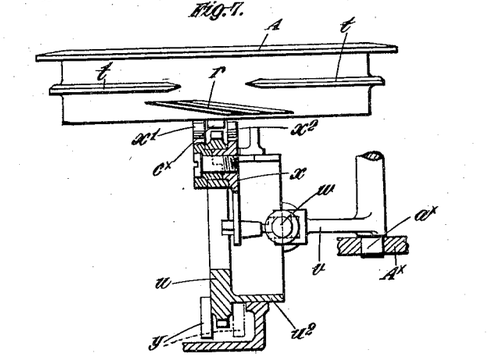
Figure 8:
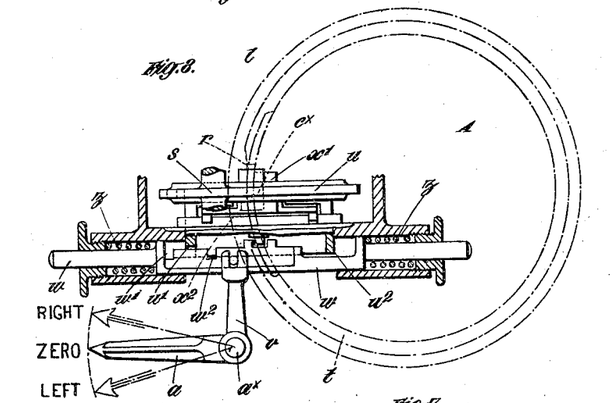
Figure 9:
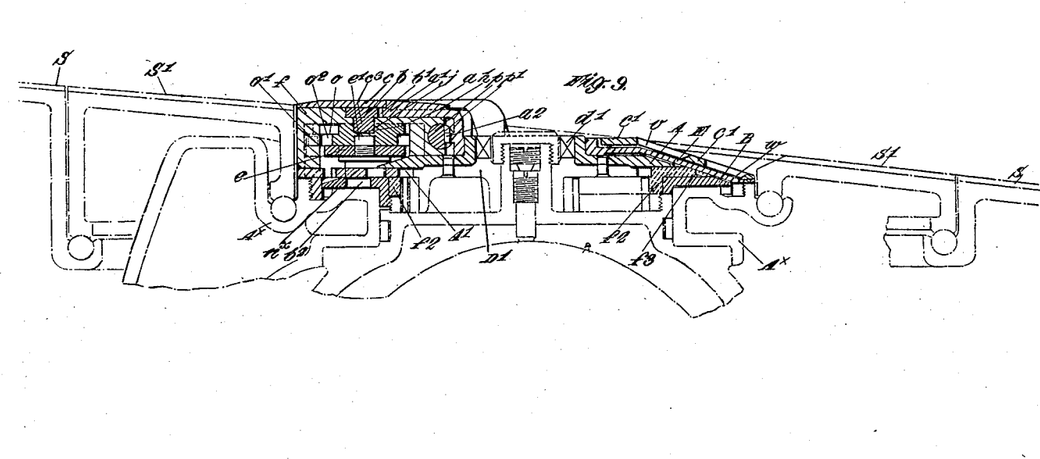
Fig. 9 is a section in a vertical plane containing the axis of the torpedo, showing another form of apparatus constructed in accordance with my invention.
Figure 10:
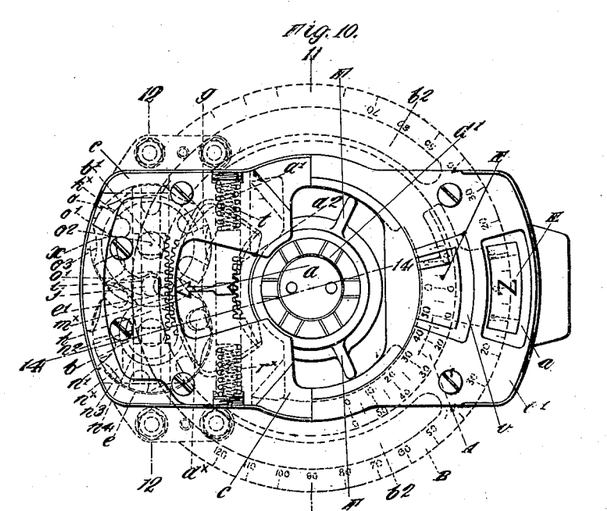
Fig. 10 is a plan of Fig. 9.
Figure 11:
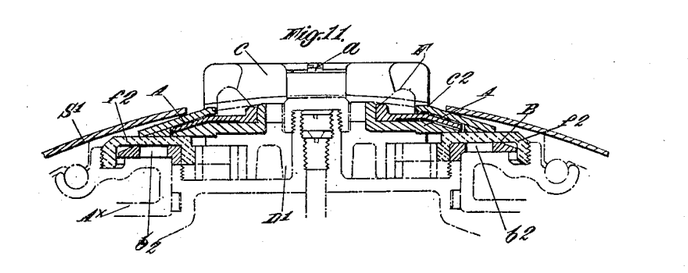
Figs. 11 and 12 are transverse sections taken approximately on the lines 11, 11 and 12, 12 respectively of Fig. 10.
Figure 12:
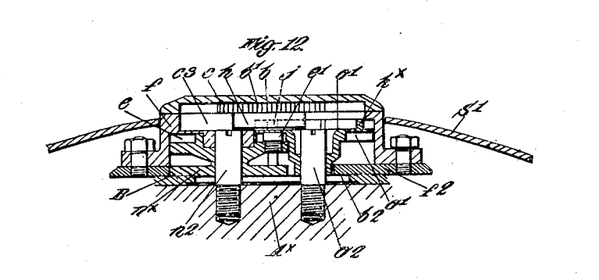
Figure 13:
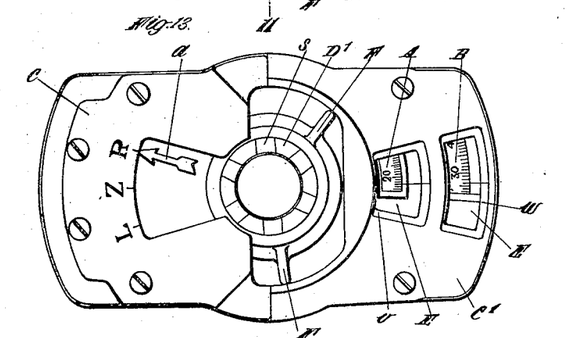
Fig. 13 is a view similar to Fig. 10, but omitting the parts indicated by dotted lines in the latter figure, showing the apparatus adjusted to give an "angle fire" toward the right.
Figure 14:
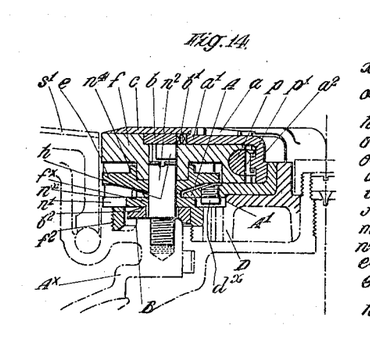
Fig. 14 is a section taken approximately on the line 14, 14 of Fig. 10.

In Figs. 1 to 5, A is the single dial graduated as aforesaid in two overlapping series, the numberings of which increase in opposite directions and in Figs. 6, 7 and 8, A is the primary or minutes dial. In all the figures $a$ is a pointer comprising a lever pivoted at $a^x$ to a casing $A^x$ attached to the shell of the torpedo. This lever can assume three different positions indicated by the words "Zero," "Right" and "Left" engraved on the shell of the torpedo as shown.

Figure 1:
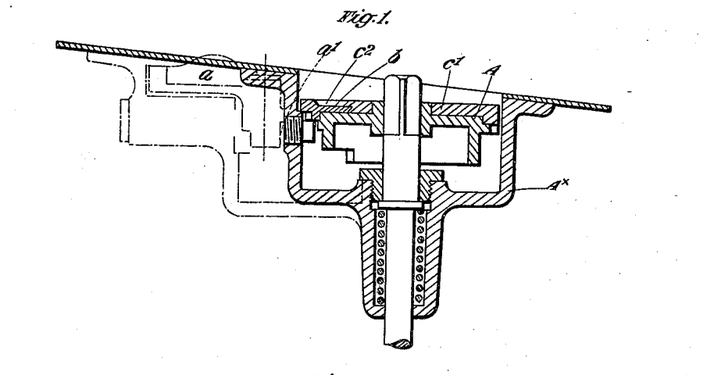
Figs. 1 and 2 are respectively a vertical section on the line 1, 1 of Fig. 2 and a plan, showing a constructional form of the invention applied to a single dial type of angling gear.

In the arrangement shown by Figs. 1 and 2 the pointer $a$ is interconnected by means of a quadrant $a'$ with a slide $b$ (carrying a rack $b'$) in which apertures $b^2$, $b^3$ are provided, these apertures being so arranged that only the numbering of the dial A having reference to the predetermined right or left position of the pointer $a$ can be seen. The dial A is covered by a plate $c'$ having a window $c^2$ which is obscured by the slide $b$ except when the apertures $b^2$, $b^3$ are opposite it. When the pointer $a$ is at zero, the window $c^2$ is closed by the slide $b$, which may also bear a zero indication as shown by the letter Z. When the pointer $a$ is set to the right the aperture $b^2$ will be opposite the window $c^2$ and the numbering on the dial A which refers to right-hand angling will be visible through it, while that which refers to left-hand angling will be concealed. When the pointer $a$ is set to the left, the aperture $b^3$ will be opposite the window $c^2$ and the numbering on the dial A which refers to the left-hand angling will be visible through it, while that which refers to right-hand angling will be concealed. A device may also be provided whereby the angling gear may be locked in the zero position, so that no motion can then be given to it without moving the pointer $a$. This will be more particularly described with reference to Figs. 4 and 5.

Figure 3:
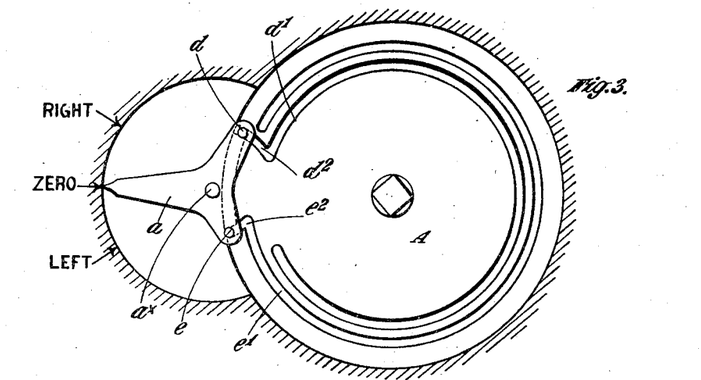
Fig. 3 is a diagrammatic plan view of another constructional form of the invention also applied to a single dial type of angling gear.

In the arrangement shown by Fig. 3, the movement of the pointer $a$ to right or left causes one or other of two pins $d$ and $e$ to enter curved grooves $d'$ and $e'$ which are cut in the lower surface of the dial A, the said pins entering the grooves through curved paths $d^2$ and $e^2$ also cut in the lower surface of the dial A. The grooves $d'$ and $e'$ are concentric with the axis of rotation of the dial, but are situated at unequal radii so as to overlap without interference. When the pin $d$ is engaged in the groove $d'$ no opposition is offered to the angular movement of the dial A through the whole of the arc covered by the groove $d'$ and similarly with regard to the pin $e$ and the groove $e'$. The pins $d$ and $e$ can only enter the grooves $d'$ and $e'$ when they are opposite to or both engaged in the entering paths $d^2$ and $e^2$ the curvature of which are arcs struck from the pivot $a^x$ of the pointer $a$, this being the case in the zero position of the pointer. The pins $d$ and $e$ are carried on the bifurcated end of the pointer $a$ and are situated at radii corresponding to the radii of the entering paths $d^2$ and $e^2$. When the dial is at zero, both pins are as shown by Fig. 3, engaged in their entering paths (or they may be opposite the ends of them) and in contact with a projection on the dial extending between the pins. In either case the dial A is prevented from moving in either direction when the pointer is in the same position as shown by Fig. 3, and cannot be moved until one pin enters a groove and the other is thrown clear of its entering path. Setting the pointer $a$ to the right engages the pin $d$ in its groove $d'$ and frees the pin $e$ from its entering path $e^2$. The dial A can then be moved in an anti-clockwise direction and the gyroscope will be angled so as to cause the torpedo to turn to the right. Similarly setting the pointer $a$ to the left engages the pin $e$ in its groove $e'$ and frees the pin $d$ from its entering path $d^2$. The dial A can then be moved in a clockwise direction and the gyroscope will be angled so as to cause the torpedo to turn to the left.

In the arrangement shown by Figs. 4 and 5 movement of the pointer $a$ operates by means of a lever arm $g$ a sliding bolt or latch $h$ which has a projection $i$ adapted to engage either with a slot $j$ cut in a circular projection $k$ on the under side of the dial A (thus locking it in zero position) or with stops $l$ or $m$ situated respectively on the inner and the outer surface of the circular projection $k$. Setting the pointer $a$ to the right withdraws the sliding bolt $h$ and disengages the projection $i$ from the slot $j$ thereby enabling the dial A to be moved in an anti-clockwise direction; it is prevented from clockwise movement by the stop $m$. Setting the pointer to the left pushes in the sliding bolt $h$ and disengages the projection $i$ from the slot $j$ thereby enabling the dial $d$ to be moved in a clockwise direction. It is prevented from anti-clockwise movement by the stop $l$. The gyroscope is thus angled so that the torpedo will turn to the right or to the left according to the setting of the pointer. Before the dial can be moved angularly it must be pressed down against the resistance of a spring $n$ so as to clear a stop $o$; after the dial has been set this stop enters a convenient notch in the edge of the dial; thus preserving the correct setting. This arrangement however is known and forms no part of the present invention; the projection $i$ and the slot $j$ are made of sufficient depth to allow the above action to occur. A spring plunger $p$ by bearing against an appropriately shaped surface of the pointer $a$, serves to return the latter to the zero position when the projection $i$ is opposite to the slot $j$.

The above described arrangements would not be appropriate for the type of angling gear having two dials of which the primary or minutes dial has to make more than one complete revolution; a stop as above described would be inapplicable to the primary dial and would not be sufficiently positive if applied to the secondary dial or to the gyro frame since in this case owing to the high ratio of the gearing between the two dials, pins or stops might be sheared by a small force. In this type of angling gear I employ the arrangement shown by Figs. 6, 7 and 8 in which a downward extension of the primary or minutes dial A is provided on its periphery with a helical element $r$, which element once in every revolution of the dial A advances a small worm wheel $s$ by one tooth. The worm wheel $s$ is prevented from revolving during the remainder of the revolution of the dial A by a collar $t$ which enters the teeth of the worm wheel $s$ and is cut away opposite the helical element $r$. The worm wheel $s$ drives a larger or stop wheel $u$ by spur gearing, the ratio being so chosen that the complete angling of the gyro causes the wheel $u$ to make less than one revolution in either direction. The pointer $a$ is connected to the stop wheel $u$ by means of a lever $v$, a bolt $w$ and a tumbler stop $x$, the latter being carried by the wheel $u$. The wheel $u$ also carries fixed stops $y$, $y$. The tumbler stop $x$ has two staggered projections $x'$, $x^2$ which engage with a fixed stop $c^x$ on the downward extension of the dial A and the stop wheel $u$ has a gap $u'$, cut in a circular projection $u^2$ on its face. The bolt $w$ has gaps $w'$, $w^2$ cut in it to allow the stop wheel $u$ to revolve when the gaps are opposite the circular projection $u^2$.

The parts are shown in the position they occupy when the pointer $a$ is at zero. The dial A is locked by the fixed stop $c^x$ being engaged between the projections $x'$, $x^2$ of the tumbler stop $x$ and the wheel $u$ is locked by the bolt $w$ being engaged in the gap $u'$. Suppose that it is desired to angle the gyro to extreme left, and that 24 turns of the dial A are necessary for this purpose. The pointer $a$ is moved to the position marked "Left" whereby the lever $v$ moves the bolt $w$ to the left thus bringing the gap $w^2$ opposite the circular projection $u^2$ of the stop wheel $u$ which is then free to revolve. By the same movement the bolt $w$ throws over the tumbler stop $x$ and the projection $x'$ is thereby thrown clear of the fixed stop $c^x$. The dial A is then free to revolve clockwise, but is prevented from revolving anti-clockwise because the projection $x^2$ has by the same movement been brought into deeper engagement with the fixed stop $c^x$. As the tumbler stop $x$ revolves with the wheel $u$, it will be seen that by the time one revolution of the dial A has been made, the projection $x^2$ will also have moved out of engagement with the fixed stop $c^x$. If the number of teeth in the wheel $u$ be 56 and the element $r$ and the worm wheel $s$ be arranged to revolve it one tooth per revolution of the dial A, then after say $23\frac{1}{2}$ turns of the dial A the fixed stops $y$ of the stop wheel $u$ will have moved up to the top i. e. to the position previously occupied by the projections $x'$, $x^2$ of the tumbler stop $x$ when the pointer $a$ was at zero. On turning the dial A the remaining half-turn to complete the full number of 24 turns, the fixed stop $c^x$ will come against one of the fixed stops $y$ and the gyro will then have been completely angled to the left. It will be observed that the stop wheel $u$ will have revolved 24 teeth, or less than half a turn. The number of teeth in the stop wheel $u$ must be, in the case given, more than 48 (say 50) in order to allow for the thickness of the fixed stop $c^x$. To angle the gyro to the right, the whole of the above operations are reversed.

It will be observed that once the pointer $a$ is thrown over to one of the positions marked "Right", "Left" and the dial A is revolved, the pointer $a$ cannot return to zero even if released, because the circular projection $u^2$ enters one or other of the gaps $w'$, or $w^2$ in the bolt $w$. Springs $z$, $z$ may be added to insure that the bolt $w$ and the pointer $a$ shall return automatically to zero as soon as the gyro reaches that position; a separate movement of the pointer $a$ is thus required when changing the angling from right to left, or vice versa.

As the position of the pointer will thus always indicate visibly the direction of setting, it is possible to use any number of interconnected dials each having a single scale extending through a complete circle with the graduations numbered in both a clockwise and an anti-clockwise direction as above stated; in this manner the errors due to backlash are less than they would be if the movement of the dial or of the stop wheel to the right or to the left were limited to half a revolution or less.

In Figs. 9 to 15 the indicating device and its associated parts are shown as being similar to those described in the specification of our Britsh patent applications Nos. 2168 of 1917 and 3130 of 1918, A being the primary or minutes dial and B the secondary or degrees dial. $a$ is the pointer for determining and visibly indicating the direction in which the torpedo will turn in taking up its predetermined course. D' is the eccentric member of the adjusting device, this member being rigidly attached to the minutes dial A; this member is operated by a key (not shown) engaging in slots $d'$ in the boss of the said member. S is the shell of the torpedo and S' is the cover that closes the opening in the shell through which the apparatus constituted by the gyroscope, its adjusting device and the indicating device can be removed or inserted as a complete unit.

Figure 15:
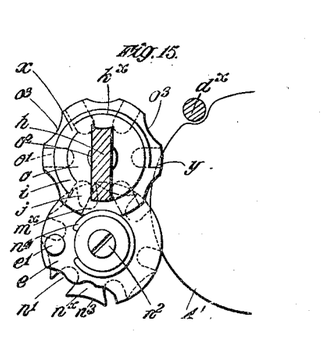
Fig. 15 is a diagrammatic plan view showing the aforesaid pin and slot contrivance in an adjusted position.

In the example shown by Figs. 9 to 15 the minutes dial A has a depending pin $d^x$ which, when the said dial is rotated, engages in turn with each of several equally pitched radial slots $n'$ formed in the periphery of a disk $n^x$ which is revolubly mounted on a fixed vertical pivot $n^2$ carried by the outer frame $A^x$ of the gyroscope. The said pin engages with the slots in such a manner that angular motion is imparted to the disk $n^x$ during a definite portion of each revolution of the minutes dial and while it is passing into and out of engagement with one or another of the slots. The rotary motion imparted to the disk by a continuous rotation of the minutes dial is thus intermittent, and to prevent the disk from revolving while the pin $d^x$ is out of engagement with any one of the slots $n'$ as shown by Fig. 15, a rim A' concentric with the minutes dial and formed on the eccentric member D', is adapted to revolve in continuous contact with a depression $n^3$ in the periphery of the disk, lying between each adjacent pair of slots and following immediately behind the last slot engaged by the pin $d^x$. Part of the rim A' is cut away to clear the disk $n^x$ when the latter is being angularly displaced.

Integral with the said disk $n^x$ or rigidly attached to it is a flange $e$ above the upper surface of which projects a pin $e'$ adapted to engage in turn with each of several equally pitched radial slots $o'$ in the lower surface of a second disk $o$ which is revolubly mounted on a second fixed vertical pivot $o^2$ carried by the outer frame $A^x$. This pin engages with the slots in such a manner that the disk $o$ receives an intermittent motion analogous to that imparted to the first mentioned disk $n^x$ but having greater intervals between successive movements. To prevent the disk $o$ from moving while the pin $e'$ is out of engagement with the slots $o'$ as shown by Fig. 15, a rim $n^4$ concentric with the first disk $n^x$ and arranged above the flange $e$, is adapted to revolve in continuous contact with a depression $o^3$ in the periphery of the second disk $o$, this depression being disposed with reference to the slots $o'$, in a similar manner to the depression and slots in the periphery of the first disk $n^x$. Part of the rim $n^4$ is cut away to clear the disk $o$ when the latter is being angularly displaced. The upper surface of the disk $o$ carries a circular projection $k^x$ having stops $i$ and $m^x$ situated one on its inner and the other on its outer surface. The aforesaid pivots $n^2$ and $o^2$ pass through a slot $b^2$ in the degrees dial B, this slot being in the form of an arc the length of which is sufficient to permit the dial to rotate freely in either direction through the maximum angle desired.

The aforesaid pointer $a$ which may assume any one of three different positions indicated by the words "Zero," "Right" and "Left" engraved on the upper surface of the indicator casing $c$ is rotated about the same geometric axis as the dials, by means of finger-projections F, F and is interconnected by means of a toothed segment $a'$ with a slide $b$ provided with rack teeth $b'$. This slide has depending from it and projecting through a slot $c^3$ in a casing $f$ a bolt or latch $h$ adapted to pass through a gap $j$ in the aforesaid circular projection $k^x$ of the disk $o$ and to engage with the stops $i$ and $m^x$ on the disk $o$. The casing $f$ is attached to the fixed toothed ring $f^2$ which in turn is screwed into the outer frame $A^x$ and fixed by grub screws or otherwise. Setting the pointer to the left withdraws the slide $b$ and disengages the bolt $h$ from the gap $j$ thereby enabling the disk $o$ through the intermediary of the aforesaid pins $d^x$ and $e'$, to be moved from its initial or zero position in an anti-clockwise direction, clockwise motion being at this time prevented by the outer stop $m^x$ on this disk. Setting the pointer to the right advances this slide $b$ and disengages the bolt $h$ from the gap $j$, thereby enabling the disk $o$ to be moved from its initial or zero position in a clockwise direction, anticlockwise motion being at this time prevented by the inner stop $i$ on the said disk. When the pointer is in the zero position the bolt is situated in the gap $j$ and the stops $m$ and $i$ therefore prevent movement of the disk in either direction.

Any attempt to re-adjust the pointer $a$ after a preliminary adjustment has been effected, is rendered futile by reason of the effective engagement of one extremity of the bolt $h$ with the inner or the outer surface of the circular projection $k^x$ as the case may be: and even if such preliminary adjustment corresponds to only one division of the minutes dial A, the angular displacement of the circular projection $k^x$ resulting therefrom provides sufficient engagement with one extremity of the bolt $h$ to lock the pointer in its adjusted position; it will be evident that before the commencement of movement of the dial (the pointer $a$ having been in its zero position before being moved) the pin $d^x$ was in full engagement with that one of the slots $n'$ which always engages with it in such zero position, and consequently the pin $e'$, was in full engagement with that one of the slots $o'$ which similarly engages, the pointer $a$ and the bolt $h$ having been then free to move. By the means hereinbefore described, such angular displacement of the circular projection $k^x$ is much greater than would be obtained by the employment of any form of continuously operated reducing gear between the minutes dial A and the disk $o$. Should it be desired after the mechanism has been set for any particular adjustment to return the whole to the zero position, no opposition to the motion of the minutes dial A in the reverse direction is encountered until the zero position is reached, when the motion is terminated by one or the other of the stops $m^x$ and $i$ coming against the bolt $h$. At this moment the gap $j$ lies opposite the bolt $h$ and the pointer $a$ is automatically returned to the zero and locking position by springs $r^x$ and $t$ which operate upon the pointer through a plunger $p$ formed with rack teeth $p'$ gearing with a segment $a^2$ on the pointer. It will thus be seen that a separate movement of the pointer is required when changing the direction of the preliminary adjustment from right to left, or vice versa, and that further, as an additional safeguard, such change can only be effected when the adjusting and indicating devices are in the zero position.

The means employed to insure that only the particular series of graduations and numerals having reference to the predetermined direction in which the torpedo is desired to turn, will be visible, comprises a plate $c'$ attached to the fixed toothed ring $f^2$ so as to cover the dials A and B, part of which plate passes through a gap cut in the said toothed ring. This plate has windows $v$ and $w$ situated opposite and above the graduations and numerals on the upper surfaces of the dials. In the zero position of the pointer $a$ the windows are obscured by a rearward extension E of the pointer which is interposed between the dials and the plate $c'$ and bears a zero indication Z. The contour of the said extension is such that movement of the pointer $a$ to the extreme left causes the numerals and graduations on the minutes dial A which refer to left hand angling to become visible through the window $v$, while those which refer to right hand angling remain concealed; similarly, the numerals and graduations on the degrees dial B which refer to left hand angling become visible through the window $w$ while those which refer to right hand angling remain concealed. In a similar manner movement of the pointer $a$ to the extreme right exposes the numerals and graduations on both the minutes and degrees dials which refer to right hand angling, and conceals those which refer to left hand angling. The graduations on the minutes dial are common to both left and right hand angling, and the numerals are in two overlapping series separated from each other by the ring of graduations and they read in reverse directions, each referring only to a particular direction, viz: left or right; the graduations and numerals on the degrees dial are also in two separate series but do not overlap although they read in reverse directions.

If, in the type of adjusting device to which the mechanism herein described is particularly applicable (viz. that disclosed in the specification of the earlier British patent applications Nos. 2168 of 1917 and 3130 of 1918) and wherein one revolution of the minutes dial corresponds to 5 degrees of angling, it is desired to angle the gyroscope to the extreme left or right, for which purpose twenty-four revolutions of the minutes dial A are necessary, the number of slots in each of the aforesaid disks $n^x$ and $o$ would be so chosen (and likewise the number of disks if the dimensions of two only were too great) that the second or last disk $o$ would make less than one complete revolution in either direction; and further at the completion of the twenty-fourth turn, extensions $x$, $y$ of the aforesaid stops $i$ and $m^x$ would engage with the bolt $h$ and terminate the motion whether clockwise or anti-clockwise as the case may be.

What I claim and desire to secure by Letters Patent of the United States is:—

1. In the gyroscopic steering mechanism of automobile torpedoes, the combination with adjustable gear for causing the torpedo, after it has been launched or ejected, to become turned through a predetermined angle with respect to the direction in which it was launched or ejected, of a device which is adjustable independently of the adjustment of said gear for determining and visibly indicating the direction in which the turn will take place.

2. In the gyroscopic steering mechanism of automobile torpedoes, the combination with adjustable gear for causing the torpedo, after it has been launched or ejected, to become turned through a predetermined angle with respect to the direction in which it was launched or ejected, of means for visibly indicating the direction in which the turn will take place and for insuring that said gear shall be adjusted only in the direction indicated.

3. In the gyroscopic steering mechanism of automobile torpedoes, the combination with adjustable gear for causing the torpedo, after it has been launched or ejected, to become turned through a predetermined angle with respect to the direction in which it was launched or ejected, of means for visibly indicating the direction in which the turn will take place and for locking said gear in the zero position.

4. In the gyroscopic steering mechanism of automobile torpedoes, the combination with adjustable gear for causing the torpedo, after it has been launched or ejected, to become turned through a predetermined angle with respect to the direction in which it was launched or ejected, of means for visibly indicating the direction in which the turn will take place and for insuring that after said gear has been adjusted its return to zero can be effected only by a movement of said gear in the reverse direction.

5. In the gyroscopic steering mechanism of automobile torpedoes, the combination with adjustable gear for causing the torpedo, after it has been launched or ejected, to become turned through a predetermined angle with respect to the direction in which it was launched or ejected, of a dial operated by said gear and provided with two series of graduations one referring to right hand turns of the torpedo and the other to left hand turns, means for visibly indicating the direction in which the turn will take place and a device operated by said means for obscuring the series of graduations that does not refer to the direction of turn indicated by said means.

6. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, and two stops on a part moving with said gear, said member assuming a position to engage with one or the other of said stops in accordance with the extreme positions to which said device has been adjusted, thereby locking said gear against movement in the reverse direction from that indicated by said device.

7. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable pointer for visibly indicating the direction in which the turn will take place, a locking member moved by said pointer, and two stops on a part moving with said gear, said member assuming a position to engage with one or the other of said stops in accordance with the extreme positions to which said pointer has been adjusted, thereby locking said gear against movement in the reverse direction from that indicated by said pointer.

8. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable pointer for visibly indicating the direction in which the turn will take place, a locking member moved by said pointer, two stops on a part moving with said gear, said member engaging with both the stops to lock the gear when the pointer is in its zero position and assuming a position to engage with one or the other of said stops when said pointer is adjusted to indicate a turn in one direction or the other, thereby locking said gear against movement to cause the torpedo to turn in the reverse direction from that indicated by said pointer.

9. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking bolt moved by said device, a stop member moving with said gear, said member having two stops with one or the other of which said locking bolt can engage to restrain said gear from movement to cause the torpedo to turn in the reverse direction from that indicated by said device.

10. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, a stop member having two stops with one or other of which said locking member can engage to prevent movement of said stop member in one direction or the other according to the position of the locking member and means operated intermittently from said gear for displacing said stop member.

11. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, a stop member having two stops with one or other of which said locking member can engage to prevent movement of said stop member in one direction or the other according to the position of the locking member and an intermittently operated pin and slot contrivance for displacing said stop member from said gear.

12. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, a stop member having two stops with one or other of which said locking member can engage to prevent movement of said stop member in one direction or the other according to the position of the locking member, an indicating dial and an intermittently operated pin and slot contrivance for displacing said stop member from said dial.

13. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, a stop member having two stops with one or other of which said locking member can engage to prevent movement of said stop member in one direction or the other according to the position of the locking member, an indicating dial and an intermittently operated self-locking contrivance for displacing said stop member from said dial.

14. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, an indicating dial, a pin on said dial, a train of radially slotted wheels operated by said pin, and segmental flanges on the last of said wheels, said flanges constituting stops with which the locking member is adapted to coöperate.

15. In the gyroscopic steering mechanism of automobile torpedoes, the combination with adjustable gear for causing the torpedo, after it has been launched or ejected, to become turned through a predetermined angle with respect to the direction in which it was launched or ejected, of an adjustable device for visibly indicating the direction in which the turn will take place, a locking member moved by said device, an indicating dial, a pin on said dial, a train of two radially slotted wheels operated by said pin, a circular flange on said dial adapted to engage with a peripheral depression in the first of said slotted wheels, a flange on the latter wheel adapted to engage with a peripheral depression in the second of said slotted wheels and segmental flanges on the last of said wheels, said segmental flanges constituting stops with which the locking member is adapted to coöperate.

In testimony whereof I affix my signature.

EDGAR LEES.